Patented June 16, 1931

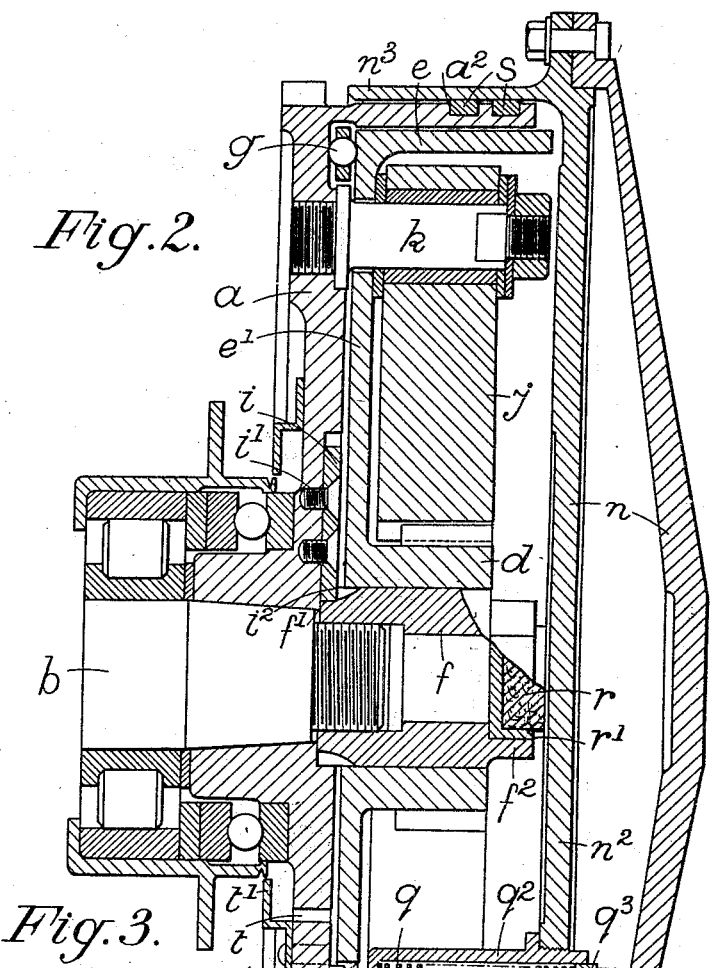

1,810,401

UNITED STATES PATENT OFFICE

JOHN HOGG ROBERTSON, OF LONDON, ENGLAND

GOVERNOR

Application filed October 7, 1930, Serial No. 486,996, and in Great Britain December 17, 1929.

This invention relates to centrifugal governors.

The invention has for its main object to provide an improved governor mechanism adapted to control the axial displacement of a slidable member, which may form the driving disc of a variable friction gearing.

Another object is to provide a positive driving connection between the governor support or casing and the axially displaceable member, whereby the power is transmitted to the latter independently of the moving parts of the governor mechanism.

A further object is to utilize the available space within the governor casing to the best advantage so that a compact but powerful mechanism is provided within the dimensions allowed.

According to this invention, the governor mechanism comprises a support secured on the governor shaft, a ring mounted upon said support and capable of rotation in relation thereto, the ring being connected to a central pinion meshing with the corresponding toothed sectors of a number of weighted levers pivoted upon the support, and a slidable driving or driven member, the latter being guided upon pillars extending forward from the support by means of sockets having roller-fitted projections which engage with cam-shaped notches upon the rotatable ring.

The invention is hereafter described with reference to the accompanying drawings, in which :—

Figure 2 is a section on the line 2—2 of Figure 1.

Figure 3 is a detail of a portion of the rotatable ring, showing one of its cam notches engaged by the roller-fitted projection from one of the guide sockets.

Figure 1:
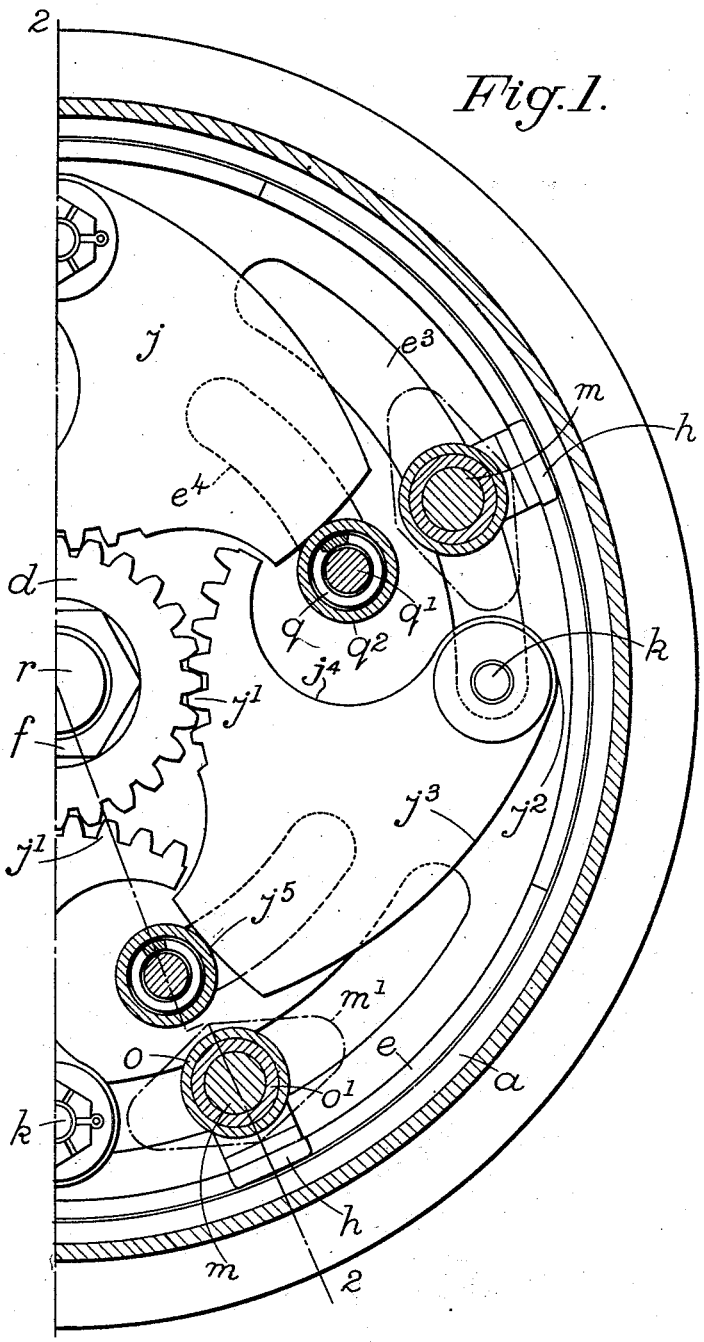
Figure 1 is a half-elevation, partly in section, of the governor mechanism enclosed in its casing.

In the construction illustrated, the support $a$ consists of a cylindrical box or casing, open at the front end, adapted to replace the customary flywheel upon the driving or governor shaft $b$, and having if desired an external gear-ring $c$ for engagement by the pinion (not shown) of an electric starter device.

A central pinion $d$ is formed upon a hollow boss at the center of an annular plate $e^1$ integral with the rotatable ring $e$, this boss being rotatable upon the exterior of a cylindrical nut $f$ securing the said support $a$ to the shaft; a ball thrust bearing $g$ is provided between the annular plate or web $e^1$ of the rotatable ring and the back or end plate $a^1$ of the support in order to take the axial pressure transmitted by the rollers $h$ to the cam notches $e^2$ upon the ring $e$. A locking plate $i$ having teeth $i^2$ to engage with serrations $f^1$ at the lower end of the nut $f$, is fixed on the inside of the end plate $a^1$ by means of screws $i^1$.

The pinion $d$ meshes with toothed sectors $j^1$ integral with weighted levers $j$ which are pivotally mounted upon studs $k$ screwed into the back plate $a^1$ of the support, there being for example four of these studs $k$ and four weighted levers $j$ spaced at equal distances around the center. A number of pillars $m$, for example four, are also screwed into the back plate $a^1$, to form guides for the axial movement of a slidable member $n$ carrying an equal number of sockets $o$ fitted with bushes $o^1$ for sliding movement along the pillars; these sockets $o$ have lateral projections $o^2$ upon which are mounted rollers $h$ secured by washers $p^1$ and screws $p^2$, the edges of the rollers bearing upon the cam notches $e^2$ upon the ring $e$. The studs $k$ and pillars $m$ may be arranged as shown at the same radial distance from the center.

The slidable member $n$, forming for example the driving member of a variable friction gearing as described in my United States patent specification No. 1,772,593, is also connected to the back plate $a^1$ by springs $q$ coiled around studs $q^1$ screwed into the back plate $a^1$, the springs being enclosed by thimbles $q^2$ screwed into the movable member, and their compression being regulated by nuts $q^3$ upon the outer ends of the studs.

The annular plate $e^1$ is formed with arcuate slots to allow of its rotary movement in relation to the support, combined slots $e^3$ being provided for the passage of the guiding pillars $m$ and the weight pivot studs $k$, and separate slots $e^4$ being provided for the passage of the guide stems or studs $q^1$ of the spring connections between the support and the slidable member. The said pillars, pivot studs and guide stems are all secured to the back plate $a^1$ or end of the support casing, being formed with circular or oval flanges for this purpose and having their extremities beyond the said flanges screwed into corresponding holes in the end plate of the casing; the guiding pillars $m$, which have to transmit the driving torque from the end plate $a^1$ to the slidable member $n$, are preferably secured to the end plate $a^1$ by screws passing through the apertured extremities of their oval flanges $m^1$, of which the major axes lie in the direction of rotation, as seen in Figure 3.

The slidable member $n$ is built up by bolting a conical disc $n^1$ upon a circumferentially rebated plate $n^2$ having apertures into which the sockets $o$ for the guiding pillars and also the thimbles $q^2$ for the connecting springs $q$ are screwed against collars or flanges from the inner side of the plate; thus the projecting ends of the pillars $m$ and their bushes $o^1$ and of the guide stems $q^1$ carrying the spring-adjusting nuts $q^3$, are covered and enclosed by the conical disc $n^1$ during operation, as seen in Figure 2.

The plate $n^2$ forming the inner portion of the slidable member may abut at its center against a pad $r$ of leather or fabric held in a shell $r^1$ inserted in the recessed head of the nut $f$ securing the casing to the governor shaft $b$, so as to cushion the return movement of the slidable member $n$ when drawn back by the springs $q$; the recessed head $f^2$ of the nut, outside the cushioning pad, may be of hexagonal or like external shape, the lower portion of this nut being cylindrical as mentioned above.

The plate $n^2$ forming the inner portion of the slidable member $n$ is provided with a cylindrical extension or flange $n^3$ fitting over and around the governor casing $a$, the exterior of the latter being grooved circumferentially at $a^2$ to receive one or more packing rings $s$, made for example of absorbent material such as felt, which prevent the escape of oil from the interior and also serve to exclude dirt. Oil may be supplied to the interior of the casing by means of holes $t$ in the end or back plate $a^1$ of the casing, these holes being surrounded by a gutter ring $t^1$ which receives the oil thrown out from the adjacent bearing of the governor shaft.

The governor levers or weights $j$ are preferably pivoted at points lying near to and on the same pitch circle as the guiding pillars $m$, that is near to the periphery of the rotatable rings, so that the same slots $e^3$ in the web of the latter will serve for the passage of both sets of parts, as already mentioned. The weights $j$ may take the form of blocks having a convex semi-cylindrical surface or boss $j^2$ concentric with their pivots, a part-cylindrical surface $j^3$ tangential thereto and of approximately the same curvature as the interior of the rotatable ring, a toothed segment $j^1$ adapted to mesh with the central pinion $d$, a concave semi-circular surface $j^4$ joining one end of the toothed segment to the first-mentioned semi-cylindrical surface $j^2$, and a blunt nose $j^5$ lying beyond the other end of the toothed segment, this nose being curved to clear the thimble $q^2$ enclosing the spring connection which is adjacent to the guiding pillar $m$ of the next group, as seen in Figure 1. Thus the weights are given free scope for their movements, while the guiding pillars and spring-thimbles are grouped beside the weight pivots, in the spaces between the pivot of one weight and the nose of the next, leaving ample room for the swinging movement of the weights without obstruction by the stationary pillars and spring-thimbles, but locating the latter parts in the spaces not required for the movement of the weights.

What I claim is:—

1. A centrifugal governor, comprising a rotary support, a ring mounted on said support and rotatable in relation thereto, a pinion mounted at the center of said ring, a plurality of weighted levers pivoted upon said support, each of said levers being formed with a toothed sector, said central pinion meshing with the toothed sectors of said levers, a plurality of parallel pillars mounted in said support, a slidable member to be operated by the governor, said slidable member being engaged upon said pillars, and cam and roller connections between said rotatable ring and said slidable member.

2. A centrifugal governor, comprising a rotary support, a ring mounted on said support and rotatable in relation thereto, a pinion mounted at the center of said ring, a plurality of weighted levers pivoted upon said support, each of said levers being formed with a toothed sector, said central pinion meshing with the toothed sectors of said levers, a plurality of parallel pillars mounted in said support, a slidable member to be operated by the governor, a plurality of guide sockets upon said slidable member, said sockets being engaged upon said pillars, rollers mounted laterally upon said sockets, and cam surfaces formed upon said rotatable ring to co-operate with said rollers.

3. A centrifugal governor, comprising a rotary support, a ring mounted on said support and rotatable in relation thereto, a pinion mounted at the center of said ring, an annular plate connecting said pinion to said ring, a plurality of weighted levers pivoted upon said support, each of said levers being formed with a toothed sector, said central pinion meshing with the toothed sectors of said levers, a plurality of parallel pillars mounted in said support, said pillars extending forward through arcuate slots in said annular plate, a slidable member engaged upon said pillars, and cam and roller connections between said rotatable ring and said slidable member.

4. A centrifugal governor comprising a rotary driving shaft, a governor support mounted on said driving shaft, a cylindrical nut securing said support to said shaft, a pinion rotatable upon the exterior of said nut, a rotatable annular plate and peripheral ring secured to said pinion, a plurality of pivots extending forward from said support, a plurality of weighted levers mounted upon said pivots, each of said levers being integral with a toothed sector meshing with said pinion, a plurality of parallel pillars extending forward from said support, a slidable member engaged upon said pillars, said annular plate being formed with slots for the passage of said pivots and pillars therethrough, and cam and roller connections between said rotatable peripheral ring and said slidable member.

5. A centrifugal governor comprising a rotary driving shaft, a governor support mounted on said driving shaft, a cylindrical nut securing said support to said shaft, a pinion rotatable upon the exterior of said nut, a rotatable annular plate and peripheral ring secured to said pinion, a plurality of pivots extending forward from said support, a plurality of weighted levers mounted upon said pivots, each of said levers being integral with a toothed sector meshing with said pinion, a plurality of parallel pillars extending forward from said support, a slidable member engaged upon said pillars, a plurality of spring connections between said support and said slidable member, said annular plate being formed with a plurality of arcuate slots for the passage of said pivots, said pillars and said spring connections therethrough, and cam and roller connections between said rotatable peripheral ring and said slidable member.

6. A centrifugal governor, comprising a rotary support, a ring mounted on said support and rotatable in relation thereto, a central pinion mounted on said ring, a plurality of weighted levers pivoted upon said support, a toothed sector provided upon each of said levers, said central pinion meshing with the toothed sectors of said levers, a plurality of parallel pillars mounted on said support, a slidable member to be operated by the governor, a plurality of guide sockets upon said slidable member, said sockets being engaged upon said pillars, a lateral projection upon each of said sockets, a roller mounted upon each of said projections, and cam notches formed in the periphery of said rotatable ring, said cam notches engaging with said rollers whereby the rotation of said ring by said weighted levers produces axial displacement of said slidable member.

7. A governor comprising a rotary driving shaft, a governor support mounted on said driving shaft, a cylindrical nut securing said support to said shaft, a pinion rotatable upon the exterior of said nut, a rotatable annular plate and peripheral ring secured to said pinion, a plurality of pivots extending forward from said support, a plurality of weighted levers mounted upon said pivots, each of said levers being integral with a toothed sector meshing with said pinion, a plurality of parallel pillars extending forward from said support, a slidable member engaged upon said pillars, a plurality of parallel studs mounted in said support, coiled springs encircling said studs, a plurality of spring thimbles mounted in said slidable member and forming abutments for the ends of said springs, adjusting means upon the outer ends of said studs forming abutments for the other ends of said springs, said annular plate being formed with a plurality of slots for the passage of said pivots, said pillars and said studs therethrough, and cam and roller connections between said peripheral ring and said slidable member.

8. A governor comprising a rotary support, a ring mounted on said support and rotatable in relation thereto, a central pinion mounted on said ring, a plurality of weighted levers pivoted upon said support, a toothed sector provided upon each of said levers, said central pinion meshing with the toothed sectors of said levers, a plurality of parallel pillars mounted on said support, a slidable member to be operated by the governor, a plurality of guide sockets upon said slidable member, said sockets being engaged upon said pillars, a plurality of parallel studs mounted in said support, coiled springs encircling said studs, a plurality of spring thimbles mounted in said slidable member and forming abutments for the ends of said springs, adjusting means upon the outer ends of said studs forming abutments for the other ends of said springs, said slidable member including an apertured plate into which said sockets and thimbles are screwed and a conical disc covering the ends of said pillars and studs projecting through said apertured plate, and cam and roller connections between said rotatable ring and said slidable member.

In testimony whereof I have affixed my signature.

JOHN HOGG ROBERTSON.